United States Patent
Hardman et al.

(10) Patent No.: US 7,437,221 B2
(45) Date of Patent: Oct. 14, 2008

(54) INTERACTIVE DEVICE FOR LEGACY COCKPIT ENVIRONMENTS

(75) Inventors: Brian T. Hardman, Greenwood, IN (US); Dennis K. McLean, Carmel, IN (US); William T. Stiffler, Greenwood, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/013,854

(22) Filed: Dec. 16, 2004

(65) Prior Publication Data

US 2008/0215192 A1    Sep. 4, 2008

(51) Int. Cl.
*G06F 15/00* (2006.01)
(52) U.S. Cl. .......................................... 701/3; 340/971
(58) Field of Classification Search ........................ None
See application file for complete search history.

(56) References Cited

U.S. PATENT DOCUMENTS

| | | | |
|---|---|---|---|
| 4,994,974 A * | 2/1991 | Cummings | 701/200 |
| 5,390,356 A | 2/1995 | Houlberg | |
| 5,550,564 A * | 8/1996 | Cragun | 345/173 |
| 5,592,198 A | 1/1997 | Fagard et al. | |
| 5,896,098 A | 4/1999 | Goode, III et al. | |
| 6,112,141 A | 8/2000 | Briffe et al. | |
| 6,188,939 B1 * | 2/2001 | Morgan et al. | 701/36 |
| 6,803,860 B1 | 10/2004 | Langner et al. | |
| 7,268,702 B2 * | 9/2007 | Chamas et al. | 340/975 |
| 2002/0015063 A1 * | 2/2002 | Kopitzke et al. | 345/810 |
| 2002/0130834 A1 * | 9/2002 | Madarasz et al. | 345/156 |
| 2003/0156137 A1 * | 8/2003 | Von Essen et al. | 345/771 |
| 2003/0184574 A1 * | 10/2003 | Phillips et al. | 345/702 |
| 2006/0060732 A1 * | 3/2006 | Tannas, Jr. | 248/205.1 |

FOREIGN PATENT DOCUMENTS

DE    4216281 A1 *  1/1993

OTHER PUBLICATIONS

Condor Engineering; ARINC 429 Tutorial [online]. [Retrieved Nov. 4, 2004.] Retrieved from the Internet : <http://www.429-arinc.com/arinc-429-tutorial.html>. pp. 1-5.
CDNU Interactive Training Solutions. Products of the DCS Corporation ITS Model. Boost CDNU Acceptance and Proficiency Quickly and Cost-Effectively, undated.
Air Force Research Laboratory/AFRL Science and Technology for Tomorrow's Air and Space Force. Success Story. Situation Awareness Data Link Radio Provides Warfighters with a Secure Communications Systems, undated.
George, Fred, Flat-Panel Displays Are Here, Business and Commercial Aviation, Jul. 1994, pp. 48-51.

* cited by examiner

*Primary Examiner*—Michael J. Zanelli
(74) *Attorney, Agent, or Firm*—Renner, Otto, Boisselle & Sklar, LLP

(57) ABSTRACT

Disclosed is an aircraft computing and display device that includes a general purpose processor, a touch screen display and a housing. The processor executes logical instructions in the form of computer software. The touch screen display forms an interactive human-machine interface by displaying video graphics and accepting user input with a pressure sensitive surface. The housing retains the processor and the touch screen and is physically configured to replace a legacy device mounted in a cockpit instrument panel of the aircraft.

10 Claims, 5 Drawing Sheets

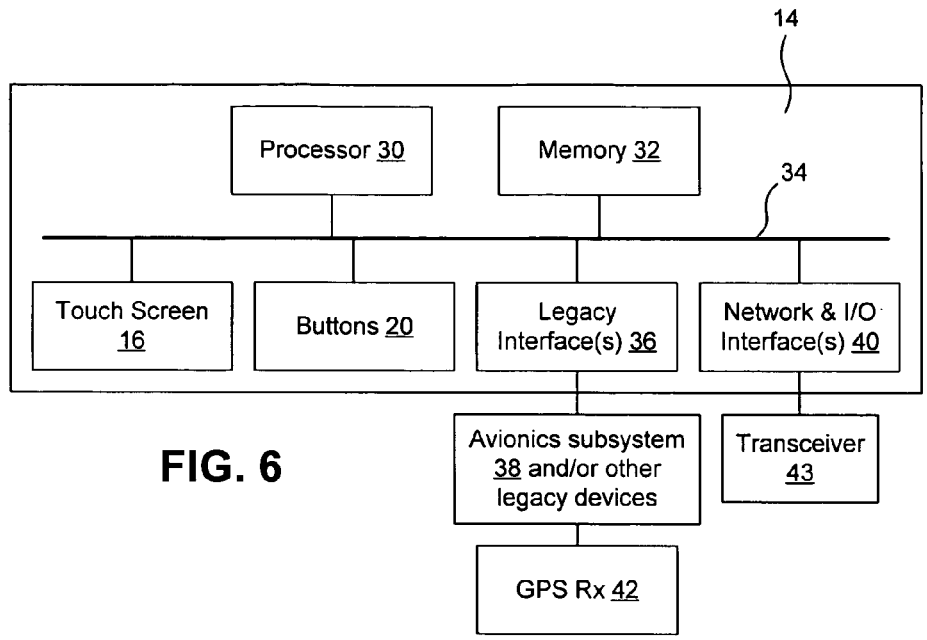
FIG. 6
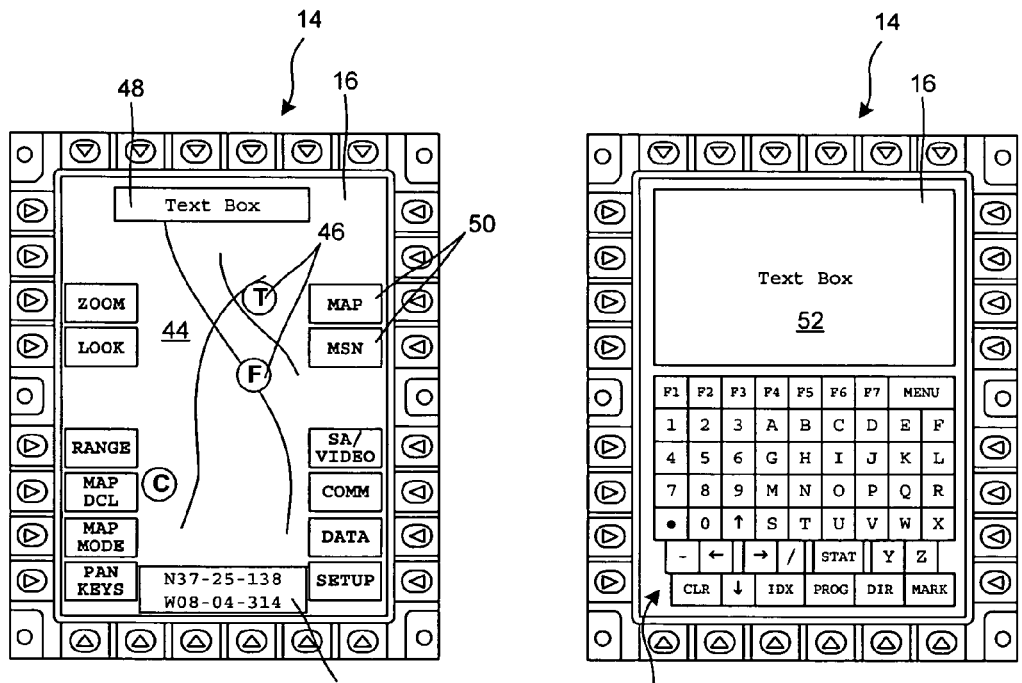
FIG. 7A          FIG. 7B

INTERACTIVE DEVICE FOR LEGACY COCKPIT ENVIRONMENTS

TECHNICAL FIELD

The present invention relates to human-machine interface device that can be installed in a cockpit of a legacy aircraft with minimal reconfiguration of the aircraft and to enhance the functionality of the instrument panel.

BACKGROUND

Aging planes and helicopters are often referred to as "legacy aircraft." For purpose of the description herein, legacy aircraft include airplanes and helicopters that are deployed in the field with existing equipment and this equipment generally has a fixed architecture and fixed functionality. For example, in many field deployed aircraft, the cockpits contain conventional gauges and instruments to display information to the pilot and/or other crew members (e.g., altimeters, airspeed indicators, turn and bank indicators, compasses, vertical speed indicators and gyros, attitude instruments, fuel gauges, engine performance gauges and the like). Although each of these gauges is adapted to present valuable information to the flight crew, each of these gauges has a single purpose and do not have interactive functionality.

It has been found that legacy military aircraft do not have cockpit devices that provide the pilot and/or cockpit crew with suitable graphical displays, data acquisition and processing functionality, and human-machine interface (HMI) to maximize the mission and/or combat fighting capability of the cockpit crew. One notable feature that is missing from the aircraft is the display of moving maps that can show enemy, friendly and neutral party positions and/or flight plan waypoints. Also missing is integrated networked communication with a command and control facility to update mission information seamlessly with avionics information from the aircraft itself.

Unfortunately, retrofitting aging military aircraft to include enhanced functionality has presented numerous challenges. These challenges are pronounced when upgrading the cockpit to include enhanced user interactive assemblies. In particular, space in the cockpit is limited by the presence of existing equipment. In addition, the existing wiring leading to the cockpit instrumentation panel has a fixed arrangement and limited data availability at the cockpit instrument panel since computer assisted processing of data and signals, if carried out, is not performed by devices in the cockpit instrument panel. Rather, processors are located in other locations of the aircraft and wires carrying only instrument driver signals are run to the cockpit instrument panels.

In view of the foregoing, the conventional approach to upgrading cockpit instrumentation is to replace a selected instrument panel component(s), the wiring running to the component(s) and the associated signal processing device(s) that is located outside of the instrument panel. As can be appreciated, such an endeavor involves significant overhaul of the aircraft. The aircraft must be taken out of service for an extended period of time. Also, considerable retraining of cockpit personnel may be needed to use the new cockpit instruments.

Accordingly, there exists a need in the art for an improved interactive device that can be efficiently integrated into legacy cockpit instrument panels.

SUMMARY OF THE INVENTION

One aspect of the invention relates to an aircraft computing and display device including a general purpose processor for executing logical instructions in the form of computer software; a touch screen display that forms an interactive human-machine interface by displaying video graphics and accepting user input with a pressure sensitive surface; and a housing that retains the processor and the touch screen, the housing physically configured to replace a legacy device mounted in a cockpit instrument panel of the aircraft.

BRIEF DESCRIPTION OF DRAWINGS

These and further features of the present invention will be apparent with reference to the following description and drawings, wherein:

FIG. 6 is a schematic block diagram of the interactive device;

FIG. 7A is a front view of the interactive device in a moving map mode with network connection to a command and control center; and FIG. 7B is a front view of the interactive device in a control display navigation unit (CDNU) legacy mode.

DESCRIPTION

Figure 1:
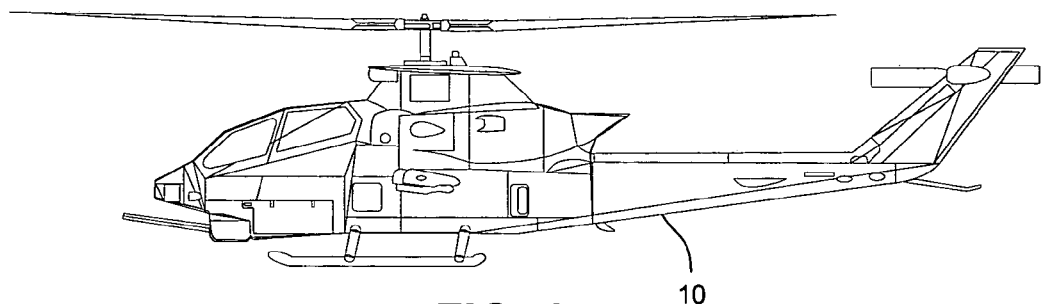
FIG. 1 is an illustration of an example legacy aircraft that includes an interactive device for legacy cockpit environments according to the present invention.

In the description that follows, like components have been given the same reference numerals, regardless of whether they are shown in different embodiments of the present invention. To illustrate the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Referring to FIG. 1, shown is a legacy aircraft 10. As indicated, legacy aircraft include airplanes and helicopters that are deployed in the field with existing equipment and this equipment generally has a fixed architecture and fixed functionality. The illustrated legacy aircraft 10 is military style helicopter that can be upgraded to include the interactive device described herein. As will be appreciated, the illustration and description of a military helicopter is a not intended to limit the application of the interactive device. That is, the illustrated military helicopter is just an example environment in which the interactive device can be deployed. The interactive device can be deployed with similar results in military airplanes, commercial airplanes and commercial helicopters.

In one embodiment, referred to herein as a control display navigation unit (CDNU) replacement embodiment, the interactive device has particular application to many legacy U.S. Navy, U.S. Marine Corps, U.S. Air Force and U.S. Army aircraft. For example, the CDNU replacement embodiment of the interactive device can function as a retrofit assembly for CDNUs of aircraft including, but not limited to, the A/UH-1 ("Heuy" helicopter), the H-3 ("Sea King" helicopter), the H46 ("Sea Knight" helicopter), the H-53 ("Super Stallion" or "Sea Stallion" helicopter), the H-60 ("Jayhawk" or "Blackhawk" helicopter), the C-2 ("Greyhound" cargo airplane), the C-130 ("Hercules" cargo airplane), the E-2 ("Hawkeye" early warning airplane), the EA-6 ("Prowler" electronic warfare airplane), the P-3 ("Orion" anti-submarine patrol airplane) and the KC-135 ("Stratotanker" refueling airplane).

Figure 2:
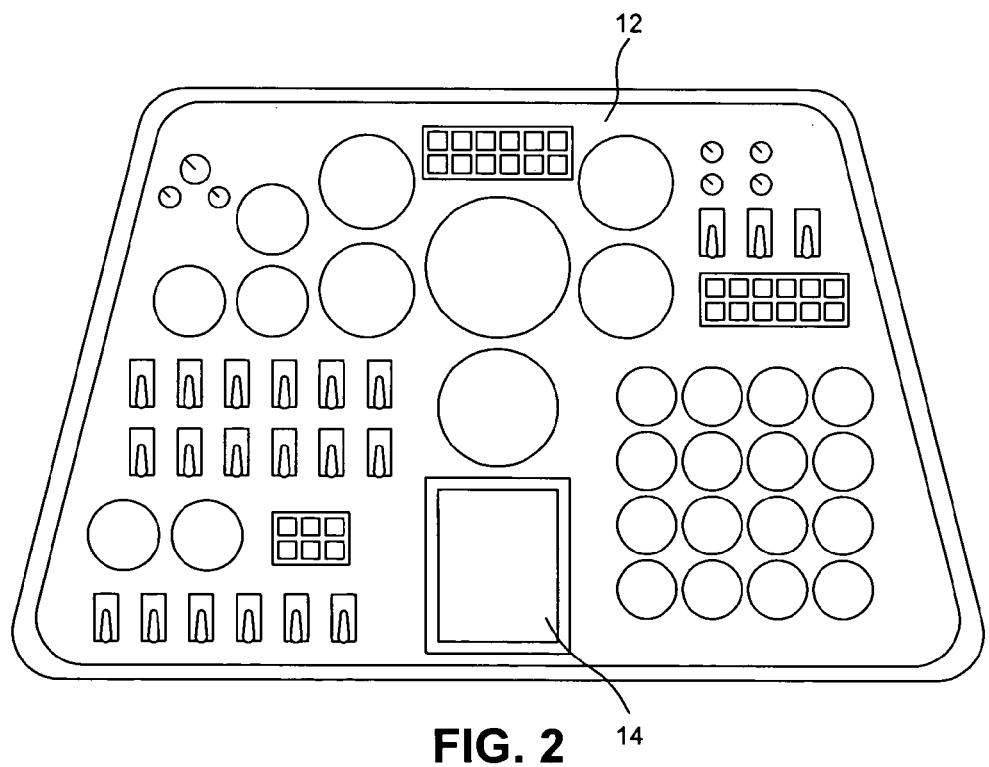
FIG. 2 is a front view of a legacy cockpit instrument panel of the aircraft that includes the interactive device.

With additional reference to FIG. 2, schematically shown is a front view of a cockpit instrument panel 12 for the legacy aircraft 10. The cockpit instrument panel 12 can include a variety of conventional instruments. As illustrated, the instruments can include, for example, gauges, toggles switches, push button switches, indicator lights, dials, knobs and so forth. In addition, the instrument panel 12 can include an interactive device 14 (sometime referred to herein as an aircraft computing and display device) in accordance with the present invention. The interactive device 14 is a "form-fit-function" replacement to a previously installed cockpit instrument panel device or assembly. That is, the old instrument panel device can be removed from the legacy aircraft 10 and the interactive device 14 can be installed in the legacy aircraft 10 with minimal changes to the remaining architecture of the aircraft, including the wiring configuration leading to the removed device. Also, the interactive device 14 is implemented to carry out or otherwise include some, if not all, of the functions of the replaced device.

In most instances, removal of the old device includes disconnecting (e.g., unscrewing) fasters that attach the old device to the instrument panel 12, pulling the old device out of the instrument panel and disconnecting wires and/or a wiring harness that establishes connection of the old device to other devices and assemblies within the aircraft 10.

Upon removal of the old device from the instrument panel 12, the interactive device 14 can be put in the place of the old device. In one embodiment, the interactive device 14 can be installed by connecting the wires and/or wiring harness previously connected to the old device, inserting the interactive device 14 into the instrument panel 12 in the location previously occupied by the old device and installing fasteners to secure the interactive device 14 to the instrument panel 12. In other words, the interactive device 14 can be made to fit into and operatively interface with the "hole" left by the old device. As used herein, the term "hole" refers to both the physical space previously occupied by the old device in the instrument panel and the legacy wiring previously connected to the old device, inclusive of the signals transmitted or present on those wires. One will appreciate, that the terms wiring and wires are used broadly and can include electrical wires and cables, optical fibers, wireless communications links and so forth.

As will be appreciated, each legacy aircraft has a number of potential cockpit instrument panel devices that can be replaced. Therefore, the designer of the interactive device is challenged to determine which of the old devices to replace. Also, since it is advantageous to construct one interactive device 14 that can be used in multiple aircraft, the designer is further challenged to assess the potential overlap of old devices among multiple legacy aircraft. As one may expect, in aggregate, the designer could be expected to survey hundreds or thousands of legacy cockpit panel devices to determine which one or ones could be replaced by the interactive device 14. In addition, the interactive device 14 is intended to carry out certain functionality and provide an adequate user interface, such as a touch screen that is sensitive to pressure applied with a user's finger and/or a stylus. Accordingly, the size of the device to be replaced should be sufficient to accommodate these characteristics of the interactive device 14. Furthermore, in the embodiment where no wiring or other architecture changes are made to the aircraft 10 other than to replace a legacy instrument panel device, the designer must evaluate the available signals (e.g., avionics information) available through the wiring for each potential replaceable device.

After an exhaustive study of the wide variety of legacy military aircraft cockpit instrument panel devices, it was determined that one device in particular is well suited to be replaced with the interactive device 14. This device is referred to as a control display navigation unit (CDNU). A CDNU is present in many U.S. Navy and U.S. Marine aircraft, as well as some U.S. Air Force and U.S. Army aircraft. The CDNU is a limited function device that serves as a control head for an avionics subsystem that is present on-board the aircraft 10. The avionics subsystem includes a dedicated computing device located in the aircraft, but apart from the cockpit instrumentation panel. The avionics subsystem uses global positioning system (GPS) data received via a sensor or receiver located outside the cockpit to run a text based navigation and flight plan system. The CDNU is the user interface to this avionics subsystem. The CDNU has a relatively small display (e.g., about two inches by about three inches) which is adapted to only display text (e.g., alphanumeric) information and text-based user menus. The CDNU also has a plurality of mechanical push buttons, and each button is associated with a fixed function. The buttons can be depressed to enter information into the avionics subsystem via the CDNU. For this purpose, the buttons are arranged to include an alphanumeric keyboard (e.g., numbers zero through nine and letters A through Z), special character buttons and function key buttons. Although the CDNU includes a controller for driving the display and communicating with the avionics subsystem, no processing of GPS data or avionics information is conducted by the CDNU. Rather, the CDNU is considered the physical interface between cockpit crew member and the avionics subsystem.

The CDNU was identified as a target legacy cockpit instrument panel device for replacement since removal of the CDNU would provide a sufficient "hole" for the interactive device 14. The size of the CDNU provides adequate space for the interactive device 14 and is wired to receive avionics and GPS data that can be processed by the interactive device 14 to carry out a desired set of functionality currently not present in any legacy aircraft cockpit instrument panel device.

Due to the replaceability of the CDNU with the interactive device 14, the description herein will be described in the exemplary context of replacing a CDNU with the interactive device 14. However, replacing cockpit instrument panel devices other than a CDNU with the interactive device 14 is explicitly contemplated as falling within the scope of the invention as defined by the claims appended hereto. Modifications to "repackage" the CDNU replacement interactive device 14 described herein to replace another cockpit instrument panel device or devices of a military or commercial aircraft will be apparent to one of ordinary skill in the art.

Figure 3:
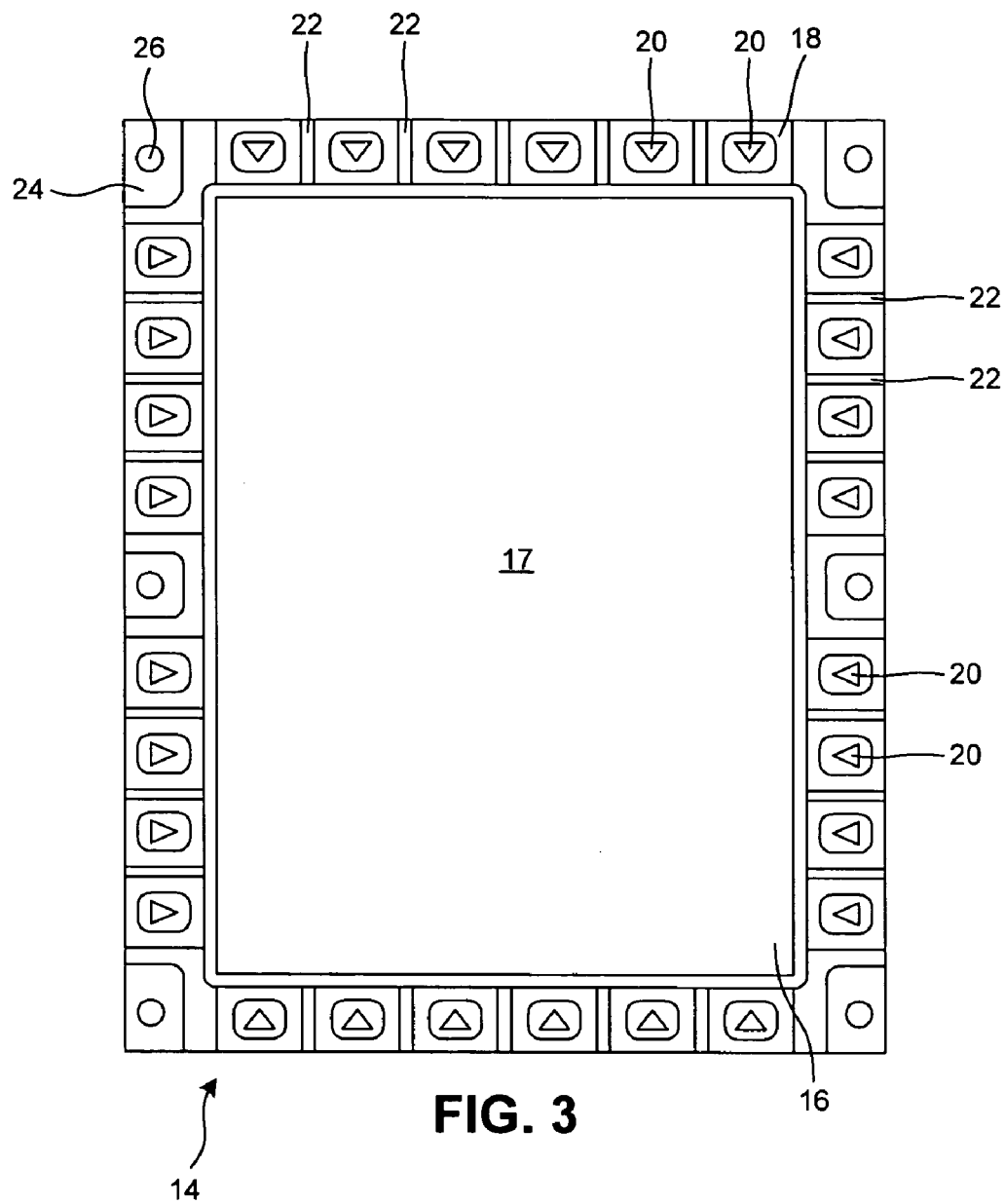
FIG. 3 is a front view of the interactive device.

Turning to FIG. 3, shown is a front view of the interactive device 14. The interactive device 14 is a modular assembly with an integrated human-machine interface. For example, the interactive device 14 includes a display 16 for presenting visual information to a pilot or other cockpit crew member of the aircraft 10. The display 16 can be, for example, a liquid crystal display (LCD) panel. Other types of displays can include a cathode ray tube (CRT) display or a plasma display. To improve visibility of the display in bright light (e.g., a sunlit environment), at night (e.g., when using night vision goggles) and/or through chemical and biological hazard protective gear (e.g., mission oriented protective posture, or MOPP, gear), the viewing surface of the display 16 can include various coatings and/or laminations. In one embodiment, the display 16 includes a pressure sensitive surface 17 (or "touch screen"), which functions as a user input to the interactive device 14.

The display 16 can be retained in a housing, such as a frame 18. The frame 18 can be made from plastic or other suitable material. The frame 18 can include a plurality of push buttons 20 that serve as user input keys. One or more of the buttons 20 can be associated with a predetermined function of the interactive device 14 and can be marked with an icon or text corresponding to the predetermined function. Alternatively, and as illustrated, the buttons 20 do not have a set function, but are used to select or specify an item or function displayed on a corresponding section of the display 16. Buttons 20 used in conjunction with the display 16 in this manner are often referred to in the art as "bezel" buttons.

Figure 4:
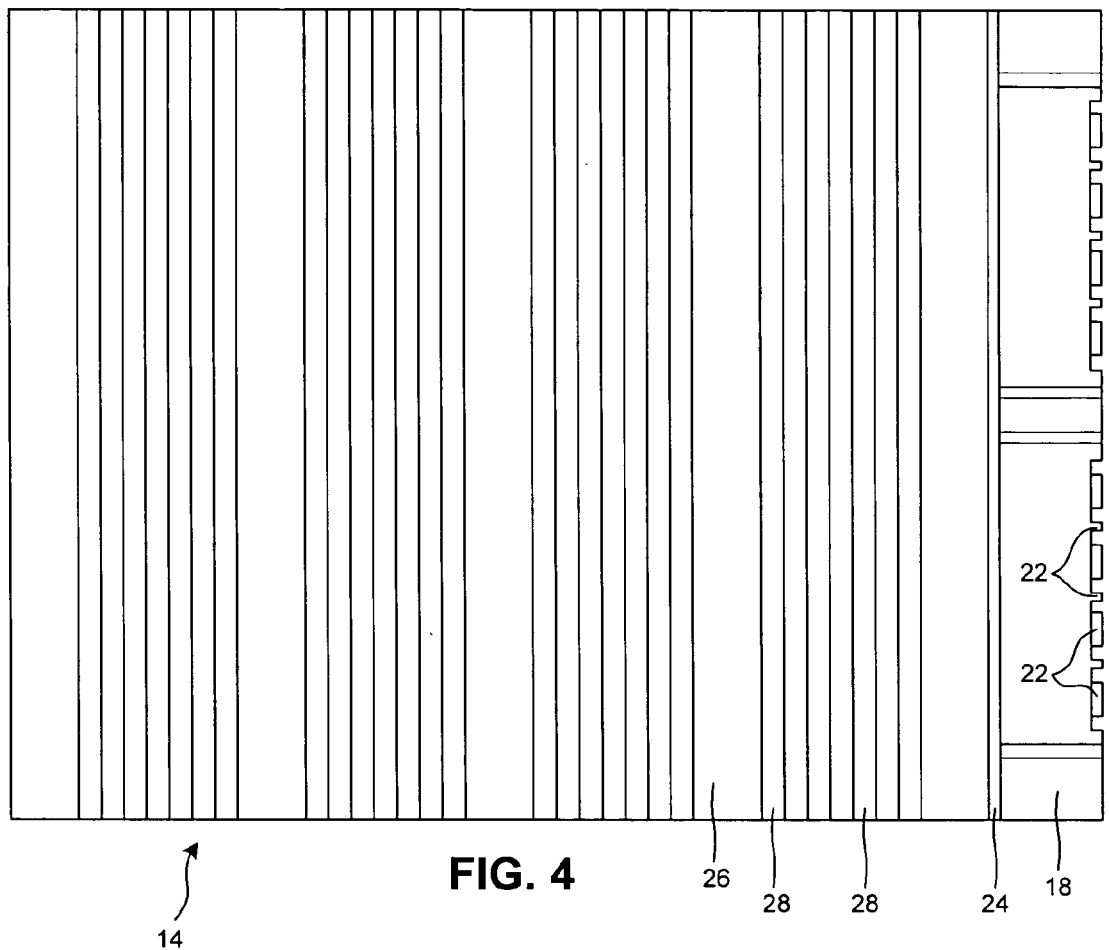
FIG. 4 is a left side view of the interactive device.
Figure 5:
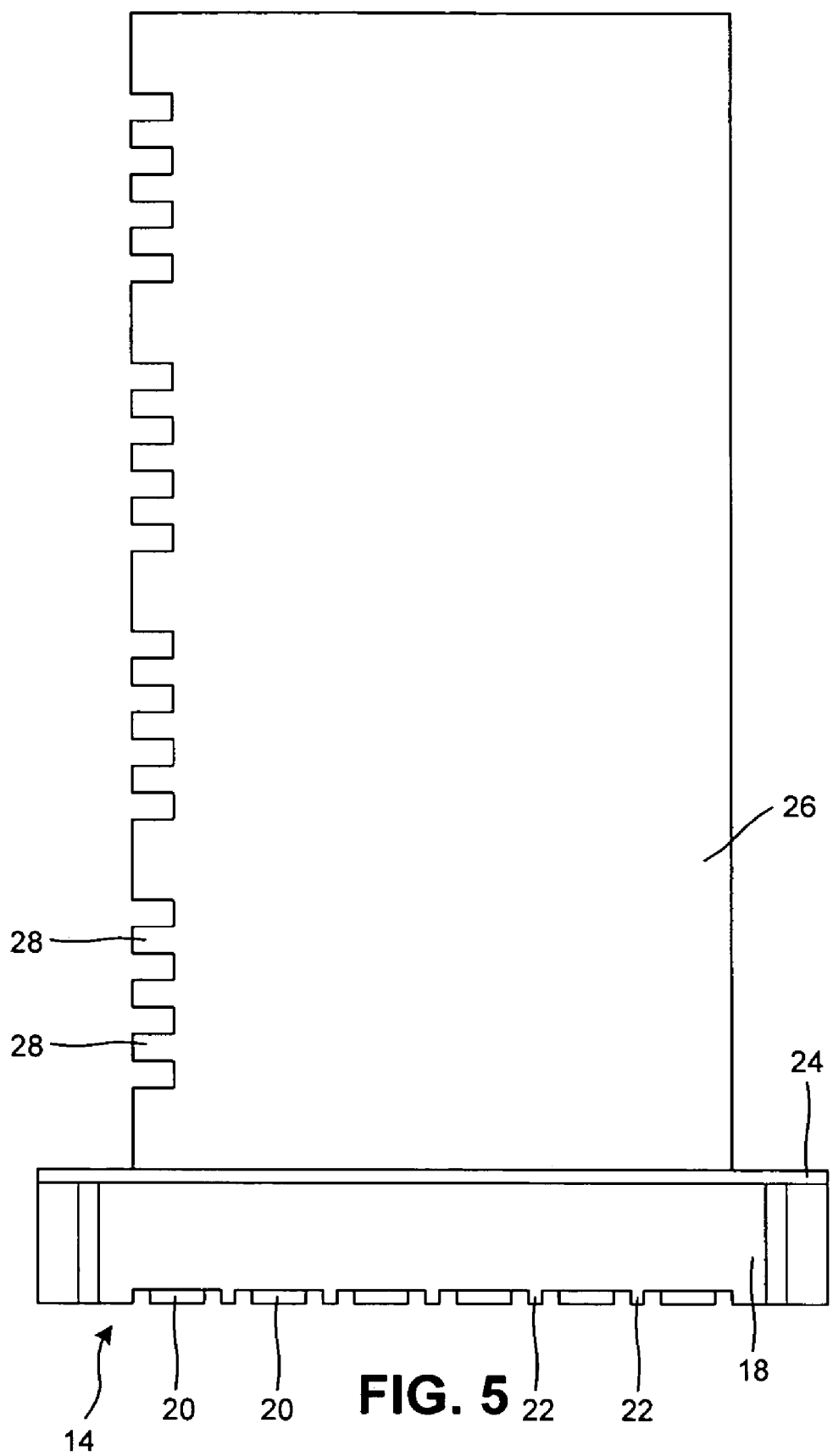
FIG. 5 is a top view of the interactive device.

With additional reference to FIGS. 4 and 5, respectively shown are a side view and a top view of the interactive device 14. The frame can include raised portions 22 between each button 20 to provide the user a tactile indicator that can be helpful in finding a particular button 20 of interest, particularly when the user's visual attention is directed elsewhere.

A mounting plate 24 can be located adjacent and behind the frame 18. The mounting plate 24 can be made from metal or other suitable material. The frame 18 can be shaped to expose portions of the mounting plate 24 in which holes 26 are formed. Fasteners, such as screws, can be inserted through the holes 26 to secure the interactive device 14 to the instrument panel 12 (FIG. 2) of the aircraft 10. The interactive device 14 can be physically arranged to mount to a standardized or non-standardized receiving location in the cockpit depending on the type of aircraft 10 and the location in the cockpit into which the interactive device 14 is to be placed. For instance, the interactive device 14 can be secured to a standard DZUS mounting rail assembly. As one of ordinary skill in the art will appreciate, the illustrated location of the interactive device 14 on the instrument panel 12 of FIG. 2 is merely exemplary. The instrument panel 12 of FIG. 12 is located in front of the pilot. In some instances, however, the interactive device 14 may be mounted to an instrument panel or equipment rail located to the side of the pilot.

The interactive device 14 includes a main housing 26 located behind the frame 18 and mounting plate 24. The frame 18 and/or mounting plate 24 can be connected to the main housing 26 or integrally formed therewith. In one embodiment, the main housing 26 is made of metal, although other suitable materials could be used. In the illustrated embodiment, the main housing 26 includes a plurality of heat radiating fins 28 that are arranged to function as a heat sink for internal components of the interactive device 14. Although not illustrated, the main housing 26 can have openings to ventilate an interior of the interactive device 14. A cooling fan or fans (not illustrated) can be mounted over the opening to enhance air flow through the interactive device 14.

With additional reference to FIG. 6, shown is a schematic block diagram of the interactive device 14. As indicated, the interactive device 14 can include a touch screen 16 that serves as a visual output device and user input device. As also indicated, the interactive device 14 can include buttons 20 that serve as user input devices. Other components of the interactive device 14, which can be disposed in and/or retained by the interactive device 14, can include a processor 30 (or processors), a memory 32 (or memories), a local interface 34, an interface 36 (or interfaces) to connect to legacy devices within the aircraft 10 such as a GPS unit 38, and an interface 40 (or interfaces) to connect to additional input devices and/or communicate with a network or networks. Also present can be support circuitry and power supplies for these components. In the CDNU replacement embodiment, the main housing 26 can accommodate up to three processors 30. However, fewer processors 30 can be present if it is desired that space in the main housing 26 should be dedicated to additional interface hardware than can otherwise be accommodated when three processors 30 and associated processor support circuitry is present.

The processor 30 is used to execute logical instructions, such as in the form of computer code (e.g., software applications). In one embodiment, the processor 30 is a PENTIUM III general purpose microprocessor available from Intel Corporation, but other general purpose processors can be used. In particular, processors designed for mobile applications (e.g., laptop computers) that have reduced heat output and power usage compared to "standard" processors of comparable capability can be used for the processor 30.

The memory 32 is used to store data, software, logic routine instructions, computer programs, files, operating system instructions, and the like. Accordingly, the memory 32 can include several devices and can comprise volatile and non-volatile memory components. Volatile memory components typically do not retain data values upon a loss of power. Non-volatile memory components retain data upon a loss of power. Thus, the memory 32 can include, for example, random access memory (RAM), read only memory (ROM), hard disks, floppy disks, optical disks (including, but not limited to, CDs and DVDs), tapes, and/or other memory components, plus associated drives and players for these memory types. Software used to carry out the functions described herein can be broken-up so that different parts can be selectively executed by the processor 30 or, if present, among multiple processors 30.

The processor 30 and the memory 32 are coupled using a local interface 34. The local interface 34 can be implemented with a data bus with an accompanying control bus or a network, for example. The interactive device 14 can have a video interface (not shown) for driving the touch screen 16. The video interface can be, for example, a video card that operatively connects the touch screen 16 to the local interface. In one embodiment, the screen 16 can be driven to display full motion video images.

As indicated, the interactive device 14 can include one or more legacy interfaces 36 for operatively connecting the interactive device 14 to existing devices and systems of the aircraft 10. The legacy interfaces 36 are implemented to physically connect to existing wires, wiring harnesses and/or sockets of the aircraft as well as provide an operative interface from the legacy devices and systems of the aircraft 10 to the interactive device 14. For instance, in the CDNU replacement embodiment, the legacy interface 36 can connect the local interface 34 to an avionics subsystem 38. The avionics subsystem 38 is, in turn, connected to a GPS receiver 42 that receives GPS data from a data source, such as a GPS satellite. In one embodiment, the legacy interface 36 and/or the processor 30 can execute a logic routine to communicate with the legacy devices and systems without change or upgrade to those devices and systems. In this embodiment, the replacement of cockpit instrument panel device with the interactive device 14 is transparent to the legacy devices and systems (e.g., the interactive device 14 "appears" to the legacy devices and systems just as the replaced cockpit instrument panel appeared).

The interface(s) 40 can be used to connect and establish communication with additional devices and systems. The additional devices and systems can be legacy devices and systems of the aircraft 10 that did not previously interface with the replaced cockpit instrument panel device and/or devices and systems that are new to the aircraft 10 (e.g., added contemporaneously with the interactive device 14). The interfaces(s) 40 can be used to establish a temporary connection with a device. For example, a USB flash memory device can be temporarily connected to the interface 40 to exchange data or files with the interactive device 14. In other arrangements, the interface 40 can be used to connect a user input device to the interactive device, such as a mouse, a keyboard, a joystick, a light pen, etc. The interface 40 also can be used to connect an output device to the interactive device, such as audio speakers, a printer and so forth. In yet other arrangements, the interface 40 can establish communication with a network or networks to allow the interactive device 14 to send and receive data signals, voice signals, video signals and the like via the network(s). in particular, the interface 40 can operatively couple the interactive device 14 to a transceiver 43 (e.g., radio) for establishing two way digital and/or analog data exchange with other aircraft, land based facilities and/or water based facilities. Accordingly, the interface 40 can be any combination of input/output ports with associated support circuitry, network cards, modems, etc.

Among the legacy interfaces 36 and the interfaces 40, the interactive device 14 can include a multiplex databus interface common to many military aircraft (e.g., MIL-STD-1553), a unidirectional data bus common to many commercial aircraft (e.g., ARINC-429), an Ethernet interface (e.g., ARINC-654), a serial interface (e.g., RS-232, RS-422 and/or RS-485), and a universal serial bus (USB) interface. Of course, the interactive device 14 have other standard and proprietary interfaces, such as, without limitation, 10 baseT, Firewire, Bluetooth, 802.11b, 802.11g, and so forth. A video capture module can be added to capture video data (e.g., from a camera mounted on the aircraft 10 or a store launchable from the aircraft 10). The captured video can be displayed on the screen 16 and/or stored for future reference, such as by saving a video file on the memory 32.

With additional reference to FIGS. 7A and 7B, the interactive device 14 can be placed in various modes of operation. It will be appreciated, that the various modes of operation can be partially or fully combined such that functionality described as being available in one mode of operation may be available in other modes of operation. It will be further appreciated that the interactive device 14 uses signals available onboard the aircraft 10 (e.g., such as signals from the legacy avionics subsystem 38 and/or other legacy devices or systems) in new ways to enhance the crew's capability to carry out various missions. For instance, GPS signals from the avionics subsystem 38 can be used to generate and update a visual moving map on the touch screen 16. In addition, the touch screen 16 can be used to allow user entry of data.

FIG. 7A shows the interactive device 14 in a moving map mode with a network connection to a command and control center. FIG. 7B shows the interactive device 14 a control display navigation unit (CDNU) legacy mode. While these are the only illustrated modes for the interactive device 14, it will be appreciated that other modes can be supported by the interactive device, examples of which are described below.

In the moving map mode (FIG. 7A), the touch screen 16 is used to display a map 44. The map 44 can be any representation of a battlefield or area over which the aircraft 10 is flown. The map 44 can include a topographic features, man-made structures (e.g., buildings and/or roads), and so forth. Overlaid on the map can be reference indicators 46 (such as symbols, icons, circled letters, etc.) to display the aircraft's position relative to the map, target location(s), friendly forces location(s), neutral party location(s), enemy forces location(s), threat location(s), and so forth.

In the moving map mode, the interactive device 14 can "move" the map 44 relative to the screen 16 as the aircraft 10 moves. In this manner, the map 44 is kept current relative to the aircraft's location. Zoom features can be used to change the relative size of map features. As will be appreciated, the map 44 does not physically move, but the logic executed by the interactive device 14 causes the displayed portion of the map 44 to update with aircraft movement. The logic updates the displayed map 44 based on aircraft location information received from devices external to the interactive device 14, such as the avionics subsystem 38. Other avionics information (e.g., speed and heading information) that is made available to the interactive device 14 also can be used in the generation of the moving map 44 or other displayed information as described by example below. To assist in map 44 generation, the interactive device can store and/or receive digital terrain elevation data (DTED), which can be actively correlated with GPS navigation data the avionics subsystem 38.

Information can be overlaid with the map 44. For instance, a text box or boxes 48 can be placed over the map 44 to provide the user with messages, system information, mission information, location and heading information and the like. User interactive blocks 50 can be shown on the screen 16. The user interactive blocks 50 can be used to guide user input and can be associated with functionality specific to the current mode of the interactive device 14. For example, when the screen 16 is pressed in the location of a particular user interactive block 50, the interactive device 14 can carry out an associated function, open additional menu options, etc. Alternatively, the blocks 50 can be used to indicate functionality associated with a corresponding bezel button 20 for the current mode of the interactive device.

The interactive device 14 can have a network connection to a command and control facility over which data is exchanged to provide the aircraft 10 with "netted warfare" capability. The data can include, for example, tactical and/or intelligence data received across a tactical digital information link (TADIL), such as the TADILJ or TADILK satellite communication standards used by the military. The data can be broadcast by the command and control facility as it is received from sources of information. Therefore, the data received by the aircraft 10 can be based on information acquired during flight and/or during execution of the aircraft's mission. The information transmitted to the aircraft 10 can relate to various aspects of the mission, including weather notices, friendly, enemy and neutral party positions, threat information, target information and so forth. The exchange of data can be bidirectional and include audio signals as well as coded and uncoded data packets (e.g., alphanumeric messages).

The tactical and/or intelligence data can be displayed to the user on the screen in the form of text messages. In the moving map mode, the tactical and/or intelligence data is preferably overlaid onto the map 44 and displayed as text, graphics and/or icons. Accordingly, the tactical and/or intelligence information can be seamlessly integrated with the map 44 such that the map 44 is updated as the information is received. Previously, TADIL messages were available only verbally through an ARC-210 radio and those messages were hand copied for comprehension and action. With the interactive device 14, the TADIL information can be transmitted to the aircraft 10 in a data network arrangement such that the data is, for example, uploaded to the interactive device 14 and visually presented to the cockpit crew. The interactive device 14 also can be used to generate audio alerts in response to specified tactical and/or intelligence data messages. As will be appreciated, the TADIL info can be used apart from moving map mode, such as by itself or in conjunction with other operational modes of the interactive device 14.

Another example mode of the interactive device 14 can include a navigation mode. In the navigation mode, the screen 16 can be used to display route overlays and/or mission plan diagrams. The overlays and drawings can be displayed in conjunction with a stationary or moving map. The navigation and/or mission data used to generate the navigation mode displays can be updated during flight by the crew (e.g., by using the touch screen and/or bezel buttons) and/or a command and control center. For instance, navigational waypoints can be added, edited or deleted by the crew or remotely by command and control personnel to update the aircraft's flight plan. The interactive device 14 can be programmed to update the display in accordance with such in-flight rerouting information and/or alert the pilot to such changes. In one embodiment, a waypoint (or set of waypoints) can be added by a touch screen operation (e.g., by touching a desired location on a displayed map with a finger or stylus that corresponds to the new waypoint). To assist in these functions or to generate a entirely new mission plan on-board the aircraft, the interactive device 14 can execute a mission planning software application. As will be understood, mission planning is conventionally not performed using cockpit instrument panel devices and rerouting has conventionally been carried out by entering coordinates with alphanumeric keys.

In addition to in-flight navigational displays, the interactive device 14 can be used to displayed approach and departure plates. The approach and departure plates can be updated based on user entered and/or received rerouting information. The approach and departure plates can be coordinated using a joint precision approach and landing system (JPALS). Therefore, the interactive device 14 can function as a JPALS approach processing and display system (sometimes referred to as a JPALS terminal). Furthermore, the interactive device 14 can function as a communications navigation surveillance/air traffic management (CNS/ATM) gateway (e.g., processing and display system) to further coordinate navigation and mission objectives.

Another example mode of the interactive device 14 includes a checklist mode. Aircraft operation involves following a number of checklists, including pre-flight, in-flight and post-flight checklists. Conventionally, these lists are embodied in paper form. The interactive device 14 can be programmed to step the aircraft crew through checklists displayed on the screen 16. An item can be marked as "checked" by touching a corresponding location on the screen 16.

Another example mode of the interactive device 14 includes an emergency procedures mode. During unusual or emergency handling of the aircraft, the interactive device 14 can be used to provide the crew with a routine to follow. Hierarchical menus can be used to guide the crew to a potentially useful course of action and/or to assist in diagnosing the cause of the problem and suggesting potential corrective action.

With reference to FIG. 7B, another example mode of the interactive device 14 is a CDNU legacy mode. In the CDNU legacy mode, the interactive device 14 emulates a CDNU to provide a control head for the avionics subsystem 38. The CDNU legacy mode can be executed in instances where an actual CDNU legacy device was replaced by the interactive device 14 or in instances where the interactive device 14 is installed in the aircraft cockpit instrument panel without replacing an actual CDNU.

In the CDNU legacy mode, the screen 16 displays a text box 52 in which information typically displayed on a CDNU screen is displayed. The screen 16 also displays a virtual keyboard 54 (e.g., a keyboard implemented with the "keys" displayed on the screen 16 rather than with physical buttons). By sequentially activating the touch sensitive areas of the screen 16 that correspond to desired keystrokes, the keyboard 54 can function as the mechanical buttons of a CDNU. In the CDNU legacy mode, the layout and functionality of the interactive device 14 resembles a CDNU for which a large number of military personnel are currently trained to operate. Therefore, little training will be needed to have those persons operate the interactive device 14 in the CDNU legacy mode.

As will be appreciated, the interactive device 14 can execute an operating system and software modules that implement the foregoing modes of operation and other modes of operation as are desired. The software can be installed, managed, upgraded or changed much in the same manner that software is managed on a personal computer. Accordingly, the interactive device 14 represents a computing and display device that can be installed in an aircraft cockpit instrument panel.

Although particular embodiments of the invention have been described in detail, it is understood that the invention is not limited correspondingly in scope, but includes all changes, modifications and equivalents coming within the spirit and terms of the claims appended hereto.

What is claimed is:

1. An aircraft computing and display device, comprising:
a general purpose processor for executing logical instructions in the form of computer software and a memory for storing the software;
a touch screen display that forms an interactive human-machine interface by displaying video graphics and accepting user input with a pressure sensitive surface; and
a housing that retains the processor, the memory and the touch screen, the housing physically configured to replace a legacy device mounted in a cockpit instrument panel of the aircraft, the legacy device being a user control interface for a subsystem of the aircraft and the legacy device including a display and mechanical buttons, each button associated with a fixed function,
wherein the aircraft computing and display device is a form-fit-function replacement for the legacy device such that the aircraft computing and display device connects to aircraft wiring dedicated to the legacy device; and
wherein, in a legacy mode, the aircraft computing and display device executes logic to carry out functions performed by the legacy device, to replicate layout and content of the legacy device display on the touch screen display and to display a virtual keyboard on the touch screen display to replicate input functionality and mechanical button arrangement of the mechanical buttons.

2. The aircraft computing and display device according to claim 1, wherein the legacy device is a control display navigation unit (CDNU) that interfaces with an avionics subsystem as a control head for the avionics subsystem and wherein the avionics subsystem is located in the aircraft and apart from the cockpit instrument panel.

3. The aircraft computing and display device according to claim 1, further comprising a network interface to a military command and control facility.

4. The aircraft computing and display device according to claim 3, wherein, in a moving map mode, the aircraft computing and display device executes logic to display a map that is updated relative to movement of the aircraft and to display an overlay with tactical information received from the command and control facility, the overlay displayed in conjunction with the map and the overlay is updated with the map relative to movement of the aircraft.

5. The aircraft computing and display device according to claim 4, wherein the overlay is generated without cockpit crew interaction with the aircraft computing and display device.

6. The aircraft computing and display device according to claim 1, wherein the aircraft computing and display device executes logic to place the aircraft computing and display device in a navigation mode and the navigation mode logic includes logic to add a flight plan waypoint upon activation of the touch screen.

7. The aircraft computing and display device according to claim 6, wherein the added waypoint has coordinates corresponding to the activated location of the touch screen relative to a display map.

8. The aircraft computing and display device according to claim 1, wherein the aircraft computing and display device is further operable in at least one of a navigation mode, a checklist mode or an emergency procedures mode.

9. The aircraft computing and display device according to claim 1, further comprising a video capture interface.

10. In combination, an aircraft having a cockpit instrument panel with an opening corresponding to a removed legacy cockpit instrument panel device and an aircraft computing and display device according to claim 1, wherein the aircraft computing and display device is secured in the opening as a form-fit-function replacement to the legacy cockpit instrument panel device.

* * * * *